United States Patent
Eshghi et al.

(10) Patent No.: US 7,200,665 B2
(45) Date of Patent: Apr. 3, 2007

(54) ALLOWING REQUESTS OF A SESSION TO BE SERVICED BY DIFFERENT SERVERS IN A MULTI-SERVER DATA SERVICE SYSTEM

(75) Inventors: Kave Eshghi, Los Altos, CA (US); Svend Frolund, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 09/981,276

(22) Filed: Oct. 17, 2001

(65) Prior Publication Data

US 2003/0074395 A1    Apr. 17, 2003

(51) Int. Cl.
    G06F 15/16    (2006.01)
(52) U.S. Cl. ............. 709/227; 709/203; 709/228; 709/223
(58) Field of Classification Search ........ 709/217–219, 709/223–224, 227–229, 203
    See application file for complete search history.

(56) References Cited

U.S. PATENT DOCUMENTS

| | | | |
|---|---|---|---|
| 5,951,694 A * | 9/1999 | Choquier et al. ............. 714/15 |
| 6,128,644 A * | 10/2000 | Nozaki ........................ 709/203 |
| 6,137,869 A * | 10/2000 | Voit et al. ............. 379/114.01 |
| 6,161,139 A * | 12/2000 | Win et al. .................... 709/225 |
| 6,385,642 B1 * | 5/2002 | Chlan et al. ................ 709/203 |
| 6,405,264 B1 * | 6/2002 | Jindal et al. ................ 719/316 |
| 6,490,624 B1 * | 12/2002 | Sampson et al. ........... 709/227 |
| 6,499,052 B1 * | 12/2002 | Hoang et al. ............... 709/203 |
| 6,557,038 B1 * | 4/2003 | Becker et al. .............. 709/227 |
| 6,587,880 B1 * | 7/2003 | Saigo et al. ................. 709/225 |
| 6,601,169 B2 * | 7/2003 | Wallace et al. ............. 713/151 |
| 6,701,367 B1 * | 3/2004 | Belkin ........................ 709/227 |
| 6,748,420 B1 * | 6/2004 | Quatrano et al. ........... 709/205 |
| 6,862,689 B2 * | 3/2005 | Bergsten et al. ................ 714/4 |
| 6,938,085 B1 * | 8/2005 | Belkin et al. ............... 709/227 |
| 6,947,982 B1 * | 9/2005 | McGann et al. ............ 709/224 |
| 6,947,992 B1 * | 9/2005 | Shachor ...................... 709/228 |
| 6,961,776 B1 * | 11/2005 | Buckingham et al. ...... 709/229 |
| 6,978,315 B1 * | 12/2005 | Burrell ........................ 709/246 |

OTHER PUBLICATIONS

Microsoft Computer Dictionary, Microsoft Press, Fifth Edition, p. No. 247-248.*

* cited by examiner

Primary Examiner—Saleh Najjar
Assistant Examiner—Faruk Hamza (57) ABSTRACT

A data service system includes web servers, each servicing any access request received by the data service system. Duplicate application servers are also provided, each processing any request directed from any one of the web servers. A session state information managing system is provided to allow different application servers to process requests belonging to a single session without requiring the requests to carry their entire session state information. The managing system includes a session state information manager that, when called by an application server in processing a request, (1) provides the session state information of the request to the application server, and (2) generate a state reference for a new session state information for the request after the application server has processed the request and generated the new session state information. The managing system also includes a store that stores all session state information.

16 Claims, 6 Drawing Sheets

ALLOWING REQUESTS OF A SESSION TO BE SERVICED BY DIFFERENT SERVERS IN A MULTI-SERVER DATA SERVICE SYSTEM

BACKGROUND OF THE INVENTION

1. Field of the Invention

The present invention pertains to Internet/Intranet systems. More particularly, this invention relates to a system and method for allowing access requests of a single session to be serviced by duplicate servers of a multi-server data service system.

2. Description of the Related Art

Figure 1:
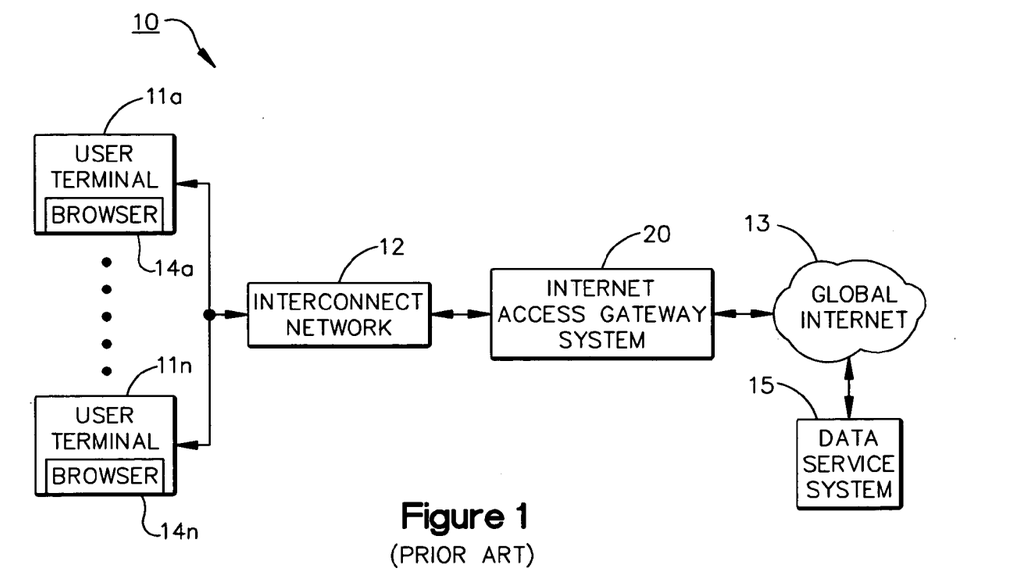
FIG. 1 illustrates an Internet system that includes a data service system implemented by prior art.

With the rapid growth of the Internet, more and more business and residential users are beginning to rely on the Internet for their mainstream and mission-critical activities. FIG. 1 illustratively shows one such configuration of the Internet. As can be seen from FIG. 1, the Internet 10 includes an Internet access gateway system 20 connected to a number of user access terminals 11a through 11n via an interconnect network 12. The user terminals 11a–11n can also be referred to as client systems. The gateway system 20 is connected to the global Internet 13, which is connected to a data service system 15. Here, the global Internet 13 is typically formed by a number of data service systems connected together via a high speed interconnect network. In addition, the gateway 20 itself may be a data service system.

Each of the user access terminals 11a–11n contains a browser software (i.e., 14–14n) that sends access requests to and receive responses from the gateway system 20. The browser (e.g., web browser or other software such as an e-mail software) allows its user (i.e., a person) to access the contents and/or applications hosted in various data service systems through the corresponding user terminal.

Figure 2:
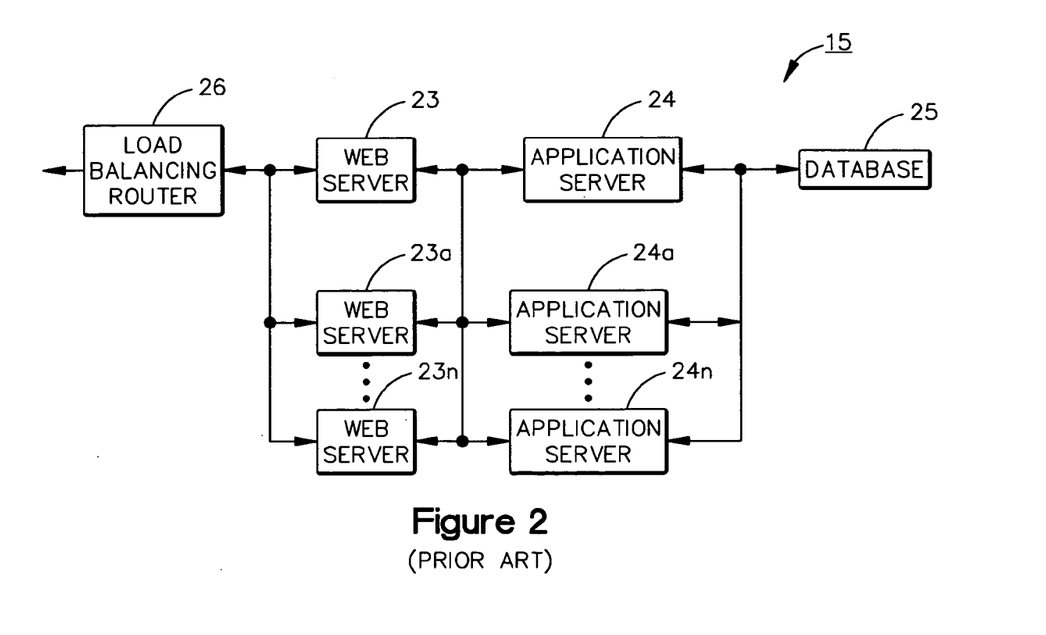
FIG. 2 shows the structure of the prior art data service system of FIG. 1.

FIG. 2 shows a prior art structure of the data service system 15. As can be seen from FIG. 2, the data service system 15 includes a web server 23, an application server 24, and a database 25. The application server 24 is employed to perform a predetermined transaction or operation (e.g., e-commerce, workflow process, etc.). The database 25 serves to store data used by the application server 24 and/or the results generated by the application server 24. Each of the servers 23-24 can be accessed by multiple client systems at the same time. This means that the servers 23–24 can handle multiple access requests at the same time. During operation, a user accesses the web server 23 by generating at least one request from a corresponding user terminal. The web server 23 then decides whether the application server 24 needs to be called. If so, the web server 23 sends the request to the application server 24. If not, the web server 23 services the request.

To alleviate overload conditions on each of the servers 23–24 and to increase the performance of the data service system 15, a number of duplicate web servers 23a–23n and a number of duplicate application servers 24a–24n are provided in the system 15. Each of the web servers 23a–23n performs the same function as the web server 23. Each of the application servers 24a–24n performs the same function as the application server 24. A load-balancing router 26 is provided to route requests to one the web servers 23–23n. This balances load of each of the web servers and application servers. This also helps to prevent any individual server from being overloaded with requests.

However, disadvantages are still associated with this prior art approach. One disadvantage is the problem of session affinity of some access requests. A session (or user session) means a sequence of HTTP requests-responses that together constitute a session. For example, the user at a user terminal or client system might first log on to a on-line shopping site by providing a username and a password. The user might then browse the products listed, add some of them to her shopping cart, proceed to the "check-out counter" by clicking on the check-out button, buy the items in the shopping cart, and then log out.

Session affinity means that for some access sessions, handling of a request within a session by an application server depends on the information obtained from the handling of a previous request within the same access session. For example, the response to the request to generate the total cost of the items chosen for purchase depends on the state of the shopping cart. This type of access requests are typically referred to as inter-dependent access requests, and the information is typically referred to as session state information.

One prior solution to this session affinity problem is to employ a session ID that indicates to which user session the request belongs. The session ID is then stored as a cookie in the client browser that generated the first request of the session. In this case, all requests belonging to the same session contain the same session ID, and the session state information is stored in the application server that receives and processes the first request of the session. This means that for an access session that contains interdependent requests, once the first inter-dependent access request is processed by an application server, all subsequent interdependent access requests will have to be routed to and processed by the same application server because it contains the required session state information. This typically complicates the load balancing operation of the router (i.e., the router 26 of FIG. 2) because the router has to direct significant amount of traffic to a single server, thus overloading that server. If the overload condition only causes the server to be busy, the request will have to wait until the server is freed up to process it. If the overload condition causes the server to crash, the session has to start all over again, thus creating reliability problems.

Another prior solution to the session affinity problem is to require that the application server return the session state information to the requesting browser so that it can be attached to a subsequent interdependent access request. This is, however, a very costly and inefficient solution because the session state information is typically very large in size (e.g., 10 KBytes). This also means that the session state information will be transmitted twice between the application server and the requesting browser. This significantly increases the network traffic and reduces reliability.

SUMMARY OF THE INVENTION

One feature of the present invention is to improve performance of a data service system in a cost effective manner.

Another feature of the present invention is to improve performance of a multi-server data service system by allowing different duplicate application servers within the system to process requests belonging to a single session.

A further feature of the present invention is to reliably allow different duplicate application servers within the system to process requests belonging to a single session in a cost effective manner.

A data service system includes a plurality of web servers, each servicing any access request received by the data service system. The data service system also includes a plurality of duplicate application servers. Each of the application servers processes any access request directed from any one of the web servers. A session state information managing system allows different application servers to process requests belonging to a single session without requiring the access requests to carry their entire session state information.

The session state information managing system includes a session state information manager called by any one of the application servers when that application server processes an access request. The session state information manager provides the session state information of the access request to the application server and generates a state reference for a new session state information for that access request after the application server has processed the access request and generated the new session state information for that access request. The managing system also includes a store that stores all session state information received by the session state information manager.

A method for allowing different application servers of a data service system to process requests of a single session includes the step of determining if an access request starts a session. If the access request initiates the session, the access request is processed in one of the application servers and the session state information of the access request is sent to a session state information manager. Then a state reference unique to the session state information is generated by the session state information manager and sent to the application server to be attached to the response to the access request. If, on the other hand, the access request does not start the session, a retrieval request with a state reference is sent to the session state information manager to retrieve the associated session state information. Then the access request with the retrieved session state information is processed in one of the application servers and a new session state information is generated. The new session state information is then sent to the session state information manager to generate a new state reference unique to the new session state information. The new state reference is then attached to the response to the access request.

Other features and advantages of the present invention will become apparent from the following detailed description, taken in conjunction with the accompanying drawings, illustrating by way of example the principles of the invention.

DETAILED DESCRIPTION OF THE INVENTION

Figure 3:
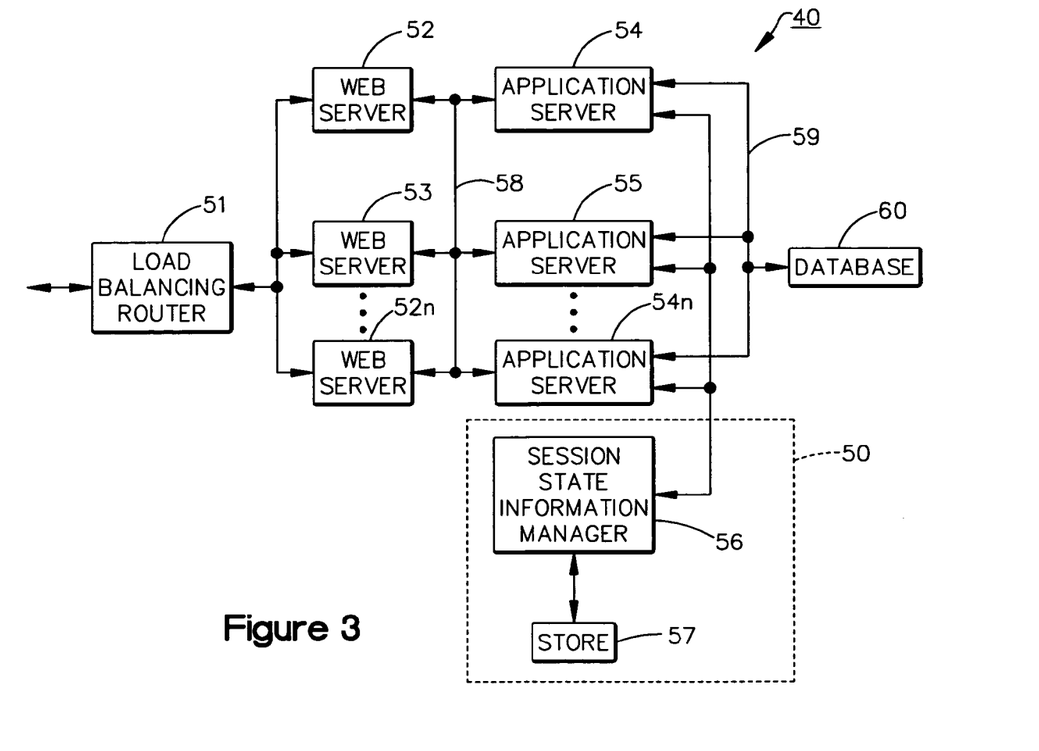
FIG. 3 shows the structure of a multi-server data service system in accordance with one embodiment of the present invention, wherein the data service system includes a number of web servers, a number of application servers that perform identical functions, and a session state information managing system.

FIG. 3 shows a data service system 40 that implements one embodiment of the present invention. The data service system 40 can replace the prior art data service system 15 in the Internet 10 of FIG. 1 to service user access requests generated from remote client systems (e.g., the client systems 11a–11n in FIG. 1).

As will be described in more detail below and in accordance with one embodiment of the present invention, the data service system 40 includes a number of duplicate web servers 52–52n, each servicing any access request received by the data service system 40 from remote client systems (not shown). The data service system 40 also includes a number of duplicate application servers 54–54n. Each of the application servers 54–54n processes any access request directed from any one of the web servers 52–52n. A session state information managing system 50 is provided to allow different ones of the application servers 54–54n to process access requests belonging to a single session without requiring the access requests to carry their entire session state information.

As described above, a session or user session means a sequence of requests and responses from and to the same user. The processing of a subsequent request in the session depends on the state of the response to a previous request (i.e., the state of the session). This means that the requests are inter-dependent within the session. For example, a typical user session may start when a user first accesses a site (i.e., by sending an access request with the web address of the site). The user then sends her user name and password in the next access request. After that, the user browses through the products on offer and adds some of the products to the user's shopping cart (in one or more access requests). The user then proceeds to the "check-out counter" by clicking on the "check-out" button. This constitutes at least another request. The user then buys the products in the shopping cart and logs out. This completes one user access session. During this session, the response that the user receives for a given access request depends on the state of the session. For example, the response to the request to generate the total cost of the items chosen for purchase after the user sends the "buy" request depends on the state of the shopping cart.

To summarize the essence of the present invention, the session state information managing system 50 includes a session state information manager 56 that can be called by any one of the application servers 54–54n to generate a state reference based on a session state information provided, or to provide a session state information based on a state reference. The application server does this when that application server processes an access request. The session information managing system 50 also includes a store 57 that stores all session state information received by the session state information manager 56 and their respective state references.

The session state information manager 56 generates the state reference by mapping the session state information to a sequence of bytes using a marshaling algorithm. Then the session state information manager 56 maps the sequence of bytes to a digest using a cryptographic hash algorithm. Then the digest is mapped to the character string using an encoding algorithm, thus forming the state reference.

One advantage of the present invention is that access requests of a single session can be processed by duplicate application servers 54–54n in a cost effective manner. Another advantage of the present invention is that different duplicate application servers within the system 40 can reliably process requests belonging to a single session. The session state information managing system 50 will be described in more detail below, also in conjunction with FIGS. 3–7.

Referring to FIG. 3, the data service system 40 is part of an Internet system (not shown in FIG. 3). Data communications to and from the data service system 40 are conducted using a predetermined communication protocol for Internet/Intranet communications. In one embodiment, the communication protocol is the Hyper Text Transport Protocol (HTTP). Alternatively, other known communication protocols for Internet/Intranet communications can also be used. The data service system 40 is employed by an Internet/Intranet Service Provider (ISP) to offer data services (e.g., web, news, or advertisement) and other services (e.g., e-commerce, e-mail).

The data service system 40 includes a load-balancing router 51 that routes access requests to one of the web servers 52–52n. The router 51 sends a request to an available one of the web servers 52–52n. Another function of the router 51 is to balance the load of each of the web servers 52–52n. The router 51 can be implemented using any known technology.

The web servers 52–52n receive access requests from the router 51. Each of the web servers 52–52n is structured around the HTTP protocol which is a request-and-response protocol, and is used to service requests. Each of the web servers 52–52n may store a number of content files that include Hyper-Text Markup Language (HTML) web pages, gif images, video clips, etc. Data transfers to and from the web servers 52–52n are enabled by transport protocols such as Transport Control Protocol (TCP) and the User Datagram Protocol (UDP). Using a currently commercially available web browser and other client applications, users via their respective user terminals can access the content files (e.g., web pages, news, images, e-mails,) stored in the web servers 52–52n. The web servers 52–52n can be implemented using any known technology.

When processing a request by one of the web servers 52–52n, that web server calls one of the application servers 54–54n. The application servers 54–54n are provided to provide additional functions (e.g., e-commerce applications or database access applications). The application servers 54–54n are operatively connected to the web servers 52–52n. Communication between one of the web servers 52–52n and one of the application servers 54–54n can be accomplished either via the CGI (Common Gateway Interface) interface or via a plug-in application. Each of the application servers 54–54n can receive a request from any one of the web servers 52–52n. The structure of each of the application servers 54–54n is identical to one another and performs the same function.

In one embodiment, the session state information manager 56 is a separate module that can be called by each of the application servers 54–54n. In another embodiment, the session state information manager 56 is located in each of the application servers 54–54n. This means that the manager 56 is duplicated so that each of the application servers 54–54n includes one such manager. The manager 56 can be implemented in software, hardware, or firmware form.

As described above, the store 57 of the managing system 50 stores all session state information received from the manager 56. The store 57 can be implemented using any known data storage technology.

As new states are created, the data associated with old session states (i.e., old session state data) become redundant. If not garbage collected, they will occupy storage space unnecessarily. Eventually, the store 57 will be full and cannot store any new data.

The operation of the data service system 40 in accordance with one embodiment of the present invention will be described. During operation, when a request starting a session is received in the data service system 40 and is assigned to be processed by one of the application servers 54–54n, that application server invokes the manager 56 to generate a session state reference for the request. As described above, the session state reference uniquely identifies the state of the session to which the request belongs. The session state reference changes when the state of the session changes.

The session state reference is then attached to the response to the request and sent back to the requesting browser (not shown in FIG. 3) for storing. The attachment can be done in the form of a cookie. Alternatively, other known forms of sending the state reference can also be employed.

When, as part of the session, the user at the requesting browser makes the next access request to the data service system 40, the session state reference cookie is sent with the request to the data service system 40, and the application server assigned to process the request. This application server may be different from the application server that processed the previous request. The application server receives the state reference contained in the cookie (the cookie is part of the HTTP header).

The application server then uses the state reference in the cookie to call the manager 56 to retrieve the corresponding session state information. The manager 56 accesses the store 57 to retrieve the corresponding session state information. The session state information is then sent to the requesting application server.

The application server then processes the request with or in the context of the session state information. As a result, a new state of the session state is created and a new session state information is generated. The application server then sends the new session state information to the store 57 via the manager 56 for storage. In addition, the manager 56 generates a new state reference to the application server to be attached to the response to the request. When the browser receives the response, it stores the cookie that contains or represents the new state reference.

Figure 4:
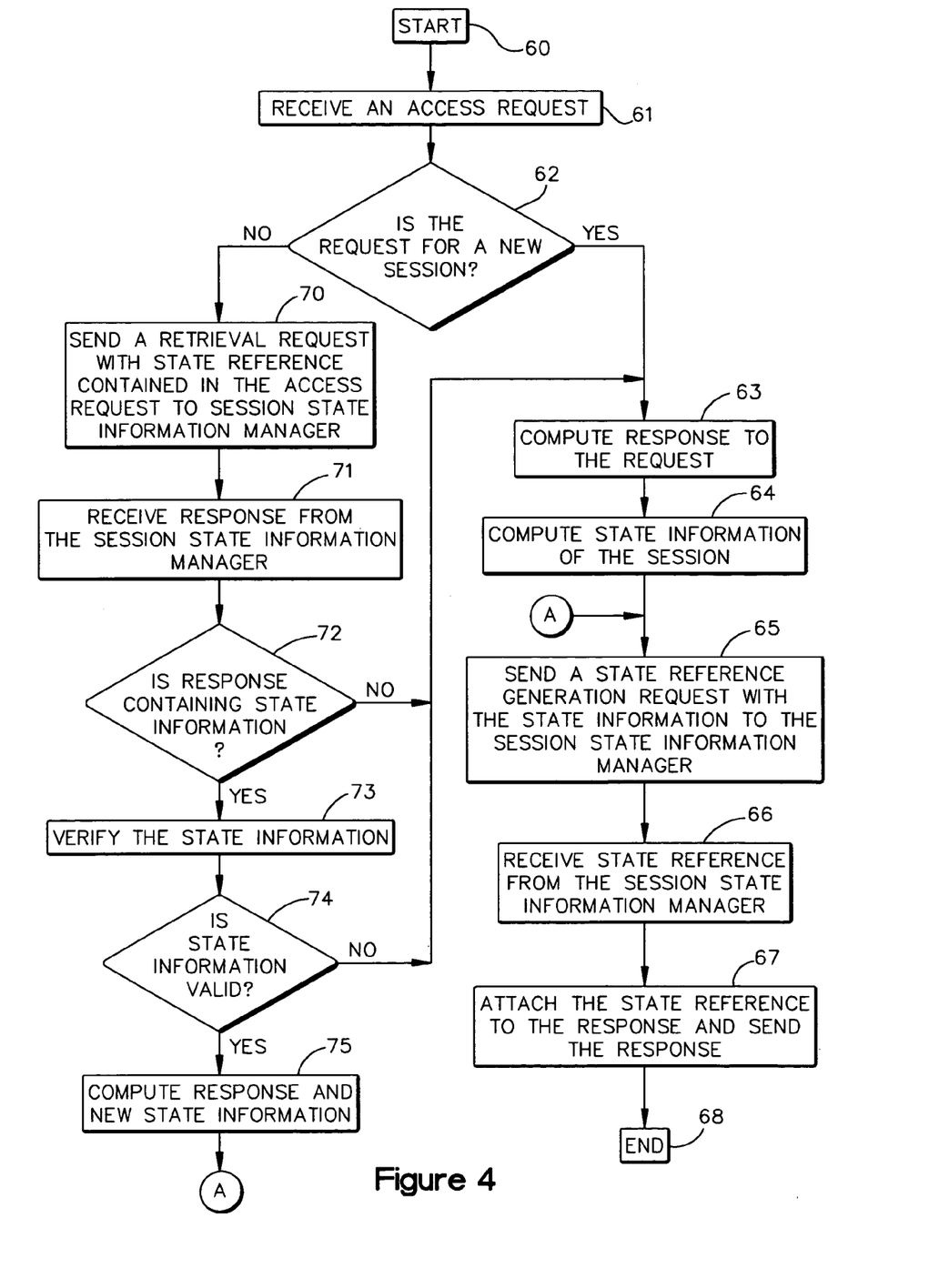
FIG. 4 shows in flow chart diagram form the operational process of any one of the application servers of FIG. 3 with respect to the session state information managing system.

Referring to FIG. 4, the operational process of any one of the application servers 54–54n (FIG. 3) is shown. The process starts at the step 60. At the step 61, the application server receives an access request for processing from one of the web servers 52–52n (FIG. 3). The application server then, at the step 62, determines if the access request starts a new session or not. If the access request starts a new session (i.e., the first request of a session), then the step 63 is performed at which the application server computes the response to the access request. At the step 64, the application server computes the session state information corresponding to the response to the access request. At the step 65, the application server sends the session state information in a state reference generation request to the session state information manager 56 (FIG. 3). This causes the session state information manager 56 to generate a state reference unique to the session state information. The session state information manager 56 then sends the state reference to the requesting application server. The application server receives the state reference at the step 66. At the step 67, the application server attaches the state reference to the response and sends the response to the requesting client system. Here, the state reference can be attached to the response in the form of, for example, a cookie. The process then ends at the step 68.

If, at the step 62, it is determined that the access request does not start a new session (meaning that the access request contains a state reference for a particular session state information), then the step 70 is performed at which the application server sends a retrieval request with the state reference received along with the access request. The retrieval request is sent to the session state information manager 56 to retrieve the corresponding session state information uniquely associated with the state reference. The application server then receives a response from the session state information manager 56 at the step 71. At the step 72, the application server determines if the response from the session state information manager 56 contains any session state information or not. If not (i.e., the retrieval operation has failed), the step 63 is then performed. This means that the access request is treated as if it were the first request to start a new session. This is failure recovery.

Failure recovery is used if a retrieval fails. If a retrieval operation fails, it is either because of time out (i.e., the corresponding session state information has been garbage collected after a predetermined long period of time has passed since the last access to the information), or failures in the application server. In this situation, application server will respond by starting a new session by performing the step 63.

If, at the step 72, the application server determines that the response from the session state information manager 56 contains the session state information, then the step 73 is performed to verify that the session state information is valid. This can be done by calling the session state information manager 56 to generate the state reference based on the session state information retrieved. If that state reference matches the state reference contained in the access request, then the retrieved session state information is verified. If not, the retrieved session state information is not verified. Alternatively, the step 73 can be omitted (i.e., the application server does not perform this step).

Then the step 74 is performed, at which the application server determines whether the session state information is verified valid or not. If not, it means that access request cannot continue an existing session and has to start a new session. In this case, the step 63 is performed.

If, at the step 74, it is determined that the session state information is verified to be valid, then the step 75 is performed, at which the application server computes the response to the access request using the retrieved session state information. In addition, the application server also computes the new session state information. Then the application server performs the step 65 to obtain the new state reference unique to the new session state information generated in the application server.

Figure 5:
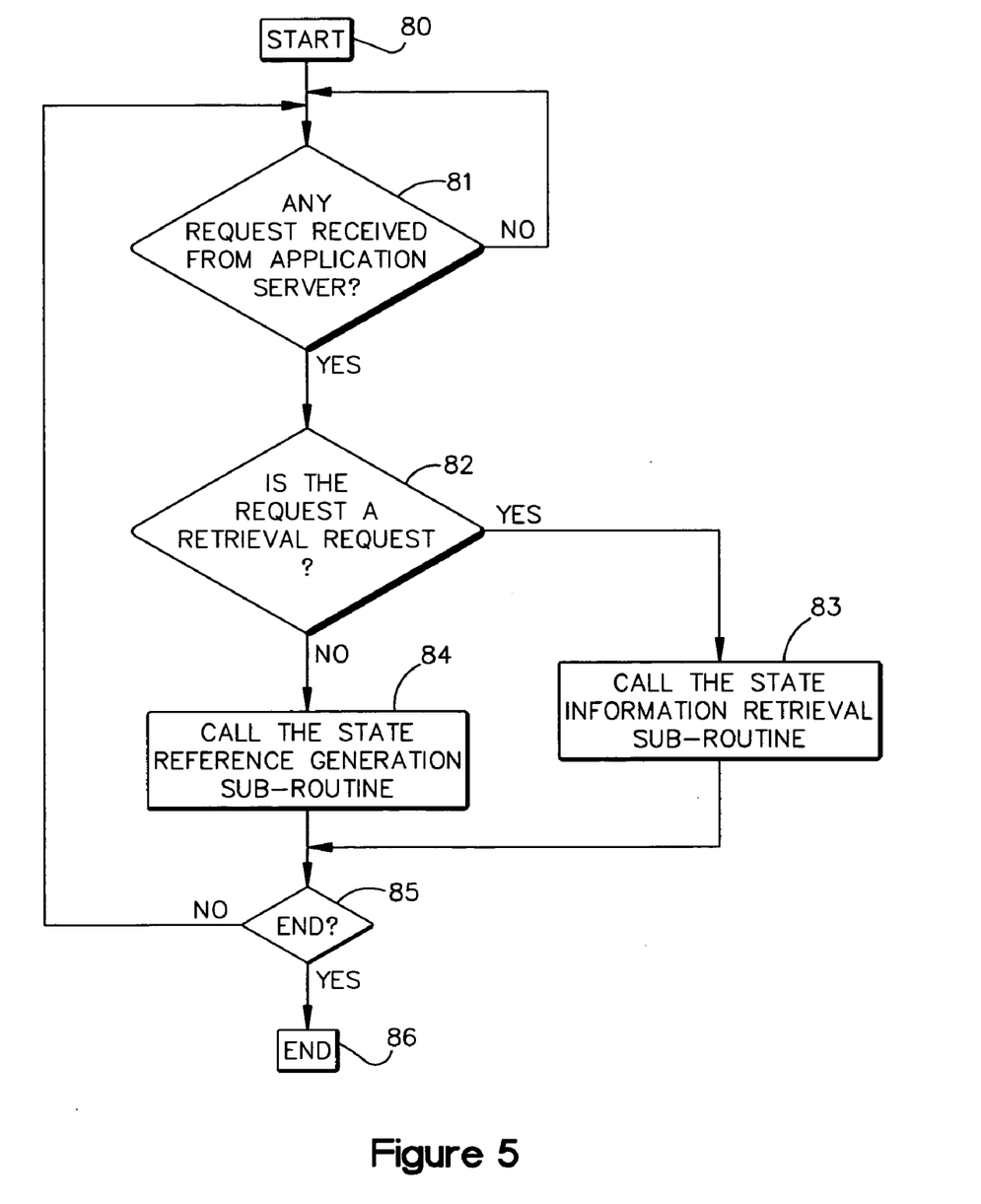
FIG. 5 shows in flow chart diagram form the operational process of the session state information manager of FIG. 3.

Referring to FIG. 5, the operational process of the session state information manager 56 of FIG. 3 is shown in the flow chart diagram form. As can be seen from FIG. 5, the process starts at the step 80. At the step 81, the session state information manager 56 determines if it has received any request (i.e., either the retrieval request or the request to generate the session state information) from any one of the application servers 54–54n that calls the service of the session state information manager 56. If not, the step 81 is repeated until the session state information manager 56 detects one such request from an application server.

If, at the step 81, it is determined that the session state information manager 56 has received the request, then the manager 56 performs the step 82 to determine whether the request is a retrieval request or not. If not (i.e., it means that the request is a state reference generation request), then the step 84 is performed at which the state reference generation sub-routine is called. If so, then the step 83 is performed, at which the state information retrieval subroutine is called.

At the step 85, the manager 56 determines if the process needs to be ended. If not, the step 81 is performed. If so, the process ends at the step 86.

Figure 6:
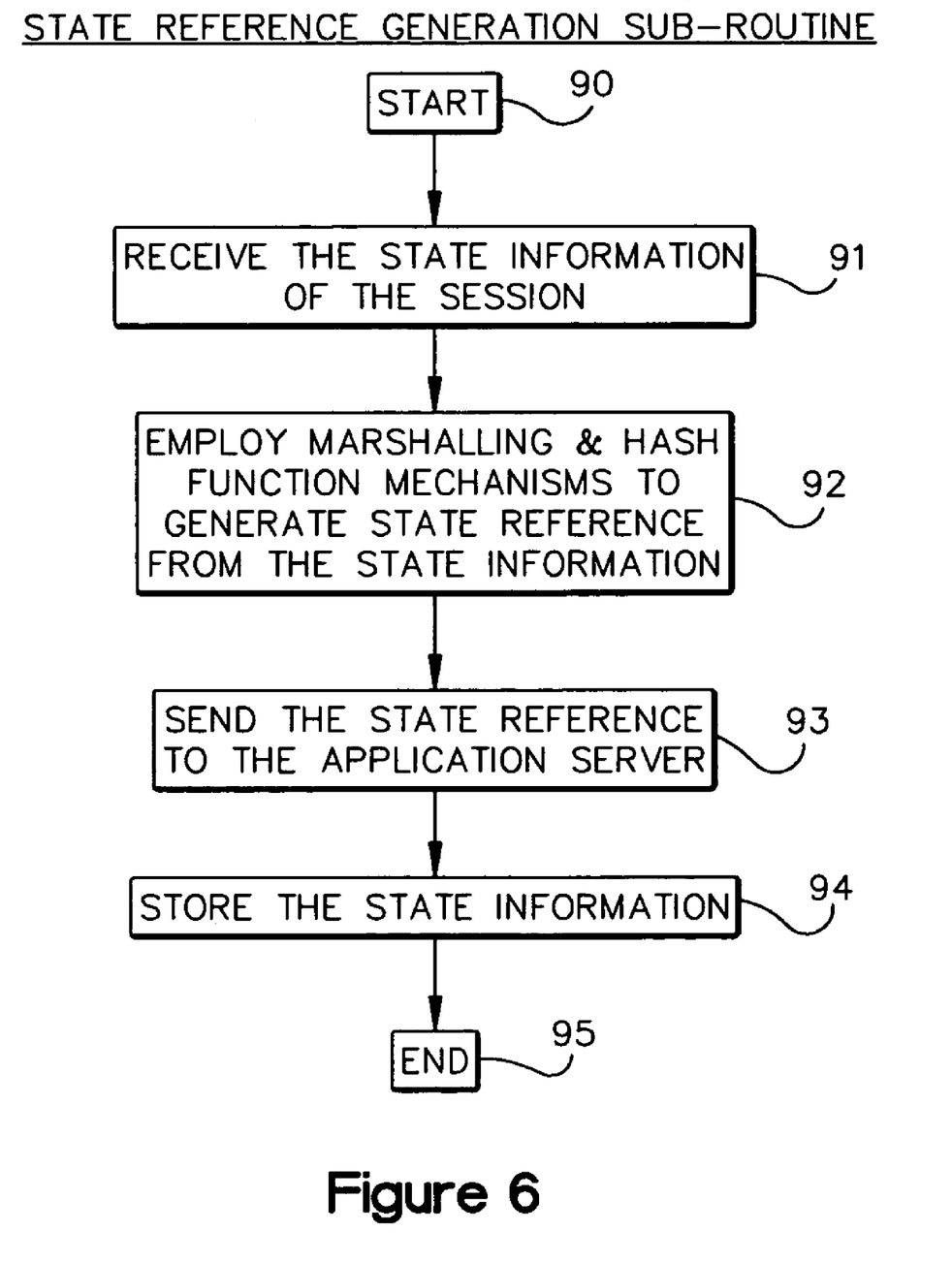
FIG. 6 shows in flow chart diagram form the steps of the state reference generation sub-routine referred to in FIG. 5.

FIG. 6 shows in flow chart diagram form the steps of the state reference generation sub-routine referred to in FIG. 5. As can be seen from FIG. 6, the process starts at the step 90. At the step 91, the session state information is received from the requesting application server. At the step 92, the manager 56 generates the state reference that is unique to the session state information provided. In one embodiment, the manager 56 generates the unique state reference by mapping the data structure of the session state information to a sequence of bytes using a marshaling algorithm. This sequence is referred to as the source sequence. The marshaling algorithm employed can be any such algorithm that is known and commercially available. The marshaling algorithm should have the property that can map the sequence of bytes into a replica of the data structure representing the session state information without losing any information.

Then the source sequence is mapped to a digest using a cryptographic hash algorithm. The digest is a short sequence of bytes of fixed length. The cryptographic hash algorithm has the probabilistic property of not generating the same digest for two different source sequences. The cryptographic hash algorithm can be any known cryptographic hash algorithm.

Then the digest is mapped to the character string using an encoding algorithm, thus forming the state reference. Many known encoding algorithms can be used to perform the job. One encoding algorithm maps each byte in the digest to its hexadecimal representation, and creates the resulting character string.

Then the manager 56 sends the generated state reference to the requesting application server at the step 93. Then the manager 56 stores the session state information in the store 57 at the step 94. A garbage collection operation may also be performed to garbage collect expired session state information. The process then ends at the step 95.

Figure 7:
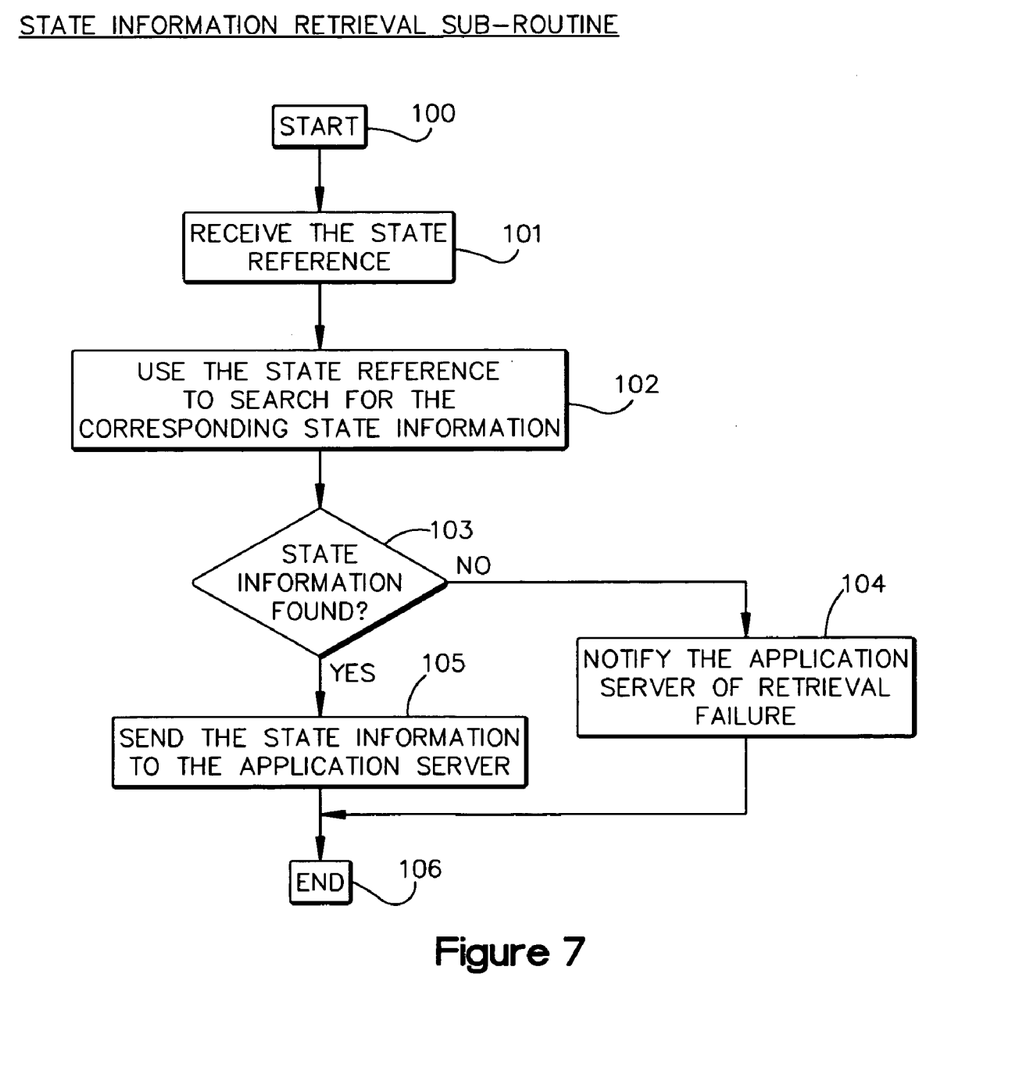
FIG. 7 shows in flow chart diagram form the steps of the state information retrieval sub-routine referred to in FIG. 5.

FIG. 7 shows in flow chart diagram form the steps of the state information retrieval sub-routine referred to in FIG. 5. Referring to FIG. 7, the process starts at the step 100. At the step 101, the manager 56 of FIG. 3 receives the state reference from the requesting application server. Then the manager 56 uses the state reference to search and retrieve the corresponding session state information stored in the store 57 at the step 102. At the step 103, the manager 56 determines if the requested session state information has been found. If not, the step 104 is performed, at which the application server is notified that the retrieval operation has failed. If the manager 56 determines that the requested session state information has been found, then the step 105 is performed to send the state information to the requesting application server. The process then ends at the step 106.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A data service system, comprising:
a plurality of web servers, each servicing any request received by the data service system;
a plurality of application servers, each processing any request directed from any one of the web servers; and
a session state information managing system separate from the application and web servers and called by each of the application servers to allow different application servers to process requests belonging to a single session without requiring the requests to carry entire session state information, wherein the session state information managing system stores and distributes session state information to the application servers without requiring the application and web servers to store any session state information to process requests, and wherein the session state information managing system (1) maps the session state information to a sequence of bytes using a marshaling algorithm, (2) maps the sequence of bytes to a digest using a hash algorithm, and (3) maps the digest to a character string using an encoding algorithm to form a state reference.

2. The data service system of claim 1, wherein the session state information managing system further comprises
a session state information manager called by any one of the application servers when that application server processes a request of a session to (1) provide the session state information of the request to the application server and (2) generate the state reference for a new session state information for that request after the application server has processed the request and generated the new session state information for that request;
a store that stores all session state information received by the session state information manager.

3. The data service system of claim 2, wherein the state reference generated is unique to the corresponding session state information and is a fixed length character string.

4. The data service system of claim 1, wherein the sequence of bytes is mapped to the digest using a cryptographic hash algorithm.

5. The data service system of claim 1, wherein the marshaling algorithm further comprises a property that can un-marshal the sequence of bytes into a replica of the session state information without any loss of data.

6. The data service system of claim 1, wherein the digest mapped by the hash algorithm is a fixed length sequence of bytes that is unique to the sequence of bytes.

7. The data service system of claim 1, wherein the encoding algorithm maps each byte in the digest to a hexadecimal representation, and creates a resulting character string.

8. A session state information managing system in a data service system having a plurality of duplicate application servers, each for processing requests, comprising:
a session state information manager called by any one of the application servers when that application server processes a request of a session to (1) provide session state information of the request to the application server and (2) generate a state reference for a new session state information for that request after the application server has processed the request and generated the new session state information for that request;
a store that stores all session state information received by the session state information manager so the plurality of application servers are not required to store any session state information to process requests, wherein the session state information manager generates the state reference by:
mapping the session state information to a sequence of bytes using a marshaling algorithm;
mapping the sequence of bytes to a digest using a hash algorithm;
mapping the digest to the character string using an encoding algorithm, thus forming the state reference.

9. The session state information managing system of claim 8, wherein the state reference generated is unique to the corresponding session state information and is a fixed length character string.

10. The session state information managing system of claim 8, wherein the sequence of bytes is mapped to the digest using a cryptographic hash algorithm.

11. The session state information managing system of claim 8, wherein the marshaling algorithm further comprises a property that can un-marshal the sequence of bytes into a replica of the session state information without any loss of data.

12. The session state information managing system of claim 8, wherein the digest mapped by the hash algorithm is a fixed length sequence of bytes that is unique to the sequence of bytes.

13. The session state information managing system of claim 8, wherein the encoding algorithm maps each byte in the digest to a hexadecimal representation, and creates a resulting character string.

14. A method of allowing different application servers in a data service system to process requests belonging to a single session, comprising
(A) determining if a request starts a session; if the request initiates the session, then
(B1) processing the request in one of the application servers and sending session state information of the request to a session state information manager separate from the application servers so the one of the application servers is not required to store the session state information for processing the request;
(B2) receiving a state reference unique to the session state information from the session state information manager and attaching the state reference to the response to the request;
if the request does not start the session, then
(C1) retrieving the session state information associated with the request from the session state information manager using a state reference contained in the request;
wherein the session state information manager generates the state reference by:
mapping the session state information to a sequence of bytes using a marshaling algorithm;
mapping the sequence of bytes to a digest using a hash algorithm;
mapping the digest to the character string using an encoding algorithm, thus forming the state reference.

15. The method of claim 14, wherein the step (C1) further comprises the steps of
verifying the session state information retried;
if the session state information is not verifiable, then performing the step (B1);
if the session state information is verified, then performing the step (C2).

16. The method of claim 14, wherein if the request does not start the session, then further:

(C2) processing the request with the retrieved session state information in one of the application servers and generating a new session state information;

(C3) sending the new session state information of the request to the session state information manager to receive a new state reference unique to the new session state information and attaching the state reference to the response to the request.

* * * * *

UNITED STATES PATENT AND TRADEMARK OFFICE
CERTIFICATE OF CORRECTION

| | | |
|---|---|---|
| PATENT NO. | : 7,200,665 B2 | Page 1 of 1 |
| APPLICATION NO. | : 09/981276 | |
| DATED | : April 3, 2007 | |
| INVENTOR(S) | : Kave Eshghi et al. | |

It is certified that error appears in the above-identified patent and that said Letters Patent is hereby corrected as shown below:

In column 9, line 38, in Claim 3, after "and is" delete "a".

In column 10, line 12, in Claim 9, after "and is" delete "a".

Signed and Sealed this

Twenty-first Day of July, 2009

JOHN DOLL
*Acting Director of the United States Patent and Trademark Office*